(12) United States Patent
Bacon-Maldonado, III et al.

(10) Patent No.: US 10,988,322 B2
(45) Date of Patent: Apr. 27, 2021

(54) CONVEYOR WITH TOWABLE ELEVATING CARRIAGE

(71) Applicant: Multilift, Inc., Lakewood, CO (US)

(72) Inventors: Job Bacon-Maldonado, III, Littleton, CO (US); Robert D. Drost, Highlands Ranch, CO (US); Chris K. Miller, Denver, CO (US); Kenneth B. Drost, Denver, CO (US); Job Maldonado, Jr., Littleton, CO (US); Clifford J. Cordell, Centennial, CO (US); James W. Lord, Lakewood, CO (US)

(73) Assignee: Multilift, Inc., Lakewood, CO (US)

( * ) Notice: Subject to any disclaimer, the term of this patent is extended or adjusted under 35 U.S.C. 154(b) by 0 days.

(21) Appl. No.: 16/793,974

(22) Filed: Feb. 18, 2020

(65) Prior Publication Data

US 2020/0262655 A1    Aug. 20, 2020

Related U.S. Application Data

(60) Provisional application No. 62/806,466, filed on Feb. 15, 2019.

(51) Int. Cl.
| | | |
|---|---|---|
| *B65G 41/00* | (2006.01) | |
| *B65G 21/14* | (2006.01) | |
| *B65G 17/06* | (2006.01) | |
| *B65G 23/00* | (2006.01) | |
| *B66D 1/06* | (2006.01) | |

(52) U.S. Cl.
CPC ......... *B65G 41/002* (2013.01); *B65G 17/065* (2013.01); *B65G 21/14* (2013.01); *B65G 23/00* (2013.01); *B66D 1/06* (2013.01)

(58) Field of Classification Search
CPC ... B65G 41/001; B65G 41/002; B65G 41/008
USPC ......................................... 198/312, 313, 320
See application file for complete search history.

(56) References Cited

U.S. PATENT DOCUMENTS

| | | | | |
|---|---|---|---|---|
| 2,446,472 A | * | 8/1948 | Graf .......................... | B60P 1/36 209/241 |
| 2,490,538 A | * | 12/1949 | Newell .................. | A01K 31/04 198/320 |
| 2,549,990 A | * | 4/1951 | Skelton ................ | B65G 41/002 198/320 |
| 2,621,777 A | * | 12/1952 | Tintes .................. | B65G 41/002 198/320 |

(Continued)

*Primary Examiner* — William R Harp
(74) *Attorney, Agent, or Firm* — Sheridan Ross P.C.

(57) ABSTRACT

A towable conveyor for transporting and elevating articles and a method and system for towing a conveyor and conveying articles up inclines is provided. The conveyor system has an elevating carriage and a plurality of support elements for conveying articles up the conveyor. Specifically, the towable conveyor system comprises a conveyor having a support frame, a plurality of support elements, a drive end with a motor, and an idle end; an elevating carriage having a first end interconnected to the support frame of the conveyor, a second with two or more wheels, and a support member extending upwardly from the elevating carriage; a cable system for raising the conveyor into a position of use and for lowering the conveyor into a towing position; one or more locking mechanisms; and a hitch for connecting the conveyor to a rear end of a towing vehicle.

20 Claims, 13 Drawing Sheets

(56) References Cited

U.S. PATENT DOCUMENTS

| | | | | |
|---|---|---|---|---|
| 2,678,717 | A | * | 5/1954 | Lucas ................ A63H 33/3044 198/311 |
| 2,710,090 | A | * | 6/1955 | Fulper .................... B65G 23/00 198/320 |
| 3,563,364 | A | * | 2/1971 | Arndt ................... B65G 41/002 198/316.1 |
| 8,678,422 | B2 | * | 3/2014 | Kaeb ...................... B60D 1/246 280/490.1 |
| 10,464,754 | B2 | | 11/2019 | Miller et al. |
| 2019/0366902 | A1 | | 12/2019 | Bacon-Maldonado, III et al. |
| 2020/0140198 | A1 | | 5/2020 | Bacon-Maldonado, III et al. |

\* cited by examiner

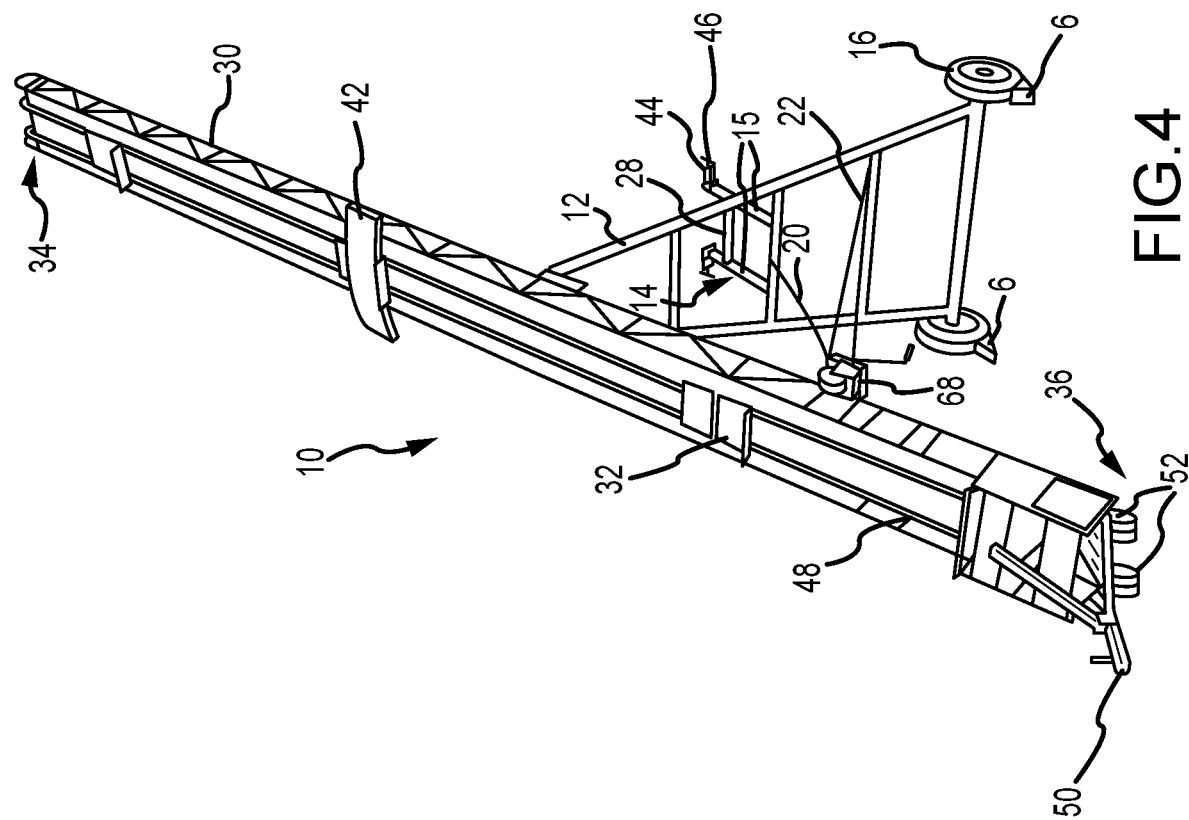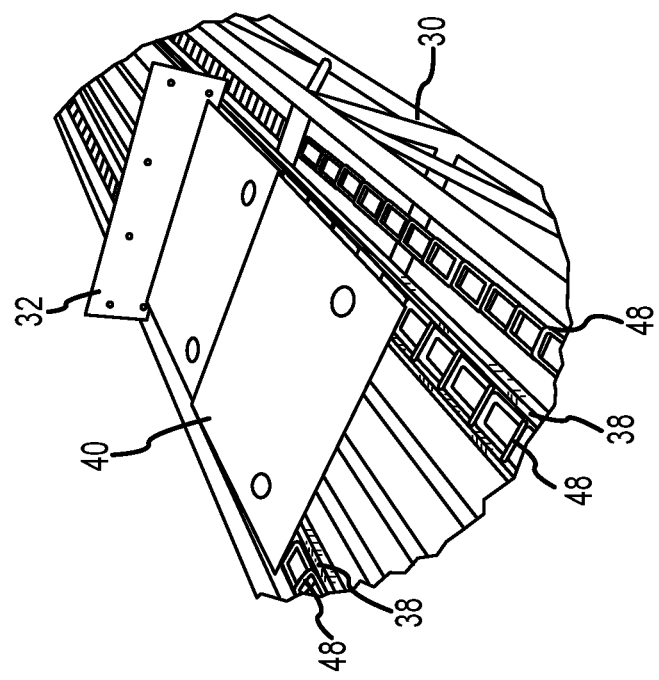

CONVEYOR WITH TOWABLE ELEVATING CARRIAGE

CROSS REFERENCE TO RELATED APPLICATIONS

This application claims the benefit of priority from U.S. Provisional Patent Application Ser. No. 62/806,466, filed Feb. 15, 2019, entitled "Conveyor with Towable Elevating Carriage"; the entire disclosure of which is hereby expressly incorporated by reference in its entirety.

FIELD OF THE INVENTION

The present invention is related generally to a towable conveyor system, and specifically to a conveyor with a towable elevating carriage.

BACKGROUND OF THE INVENTION

Conveyors are typically used at one site and rolled around on wheels to move from specific location to location within the site. Conveyors typically must lean against a structure for support and can damage the structure, e.g., gutters. Few conveyors exist that are interconnected to a vehicle or trailer such that they can be used at various sites, such as construction sites.

Existing truck-mounted conveyors usually require a CDL-rated truck. Truck-mounted conveyors commonly are used to convey articles and handle loose materials in construction, residential roof replacement, and agricultural applications. Moreover, existing truck-mounted conveyors are expensive and heavy. Existing free-standing conveyors that are transported by motor vehicle are difficult to maneuver at the job site, are heavy, and are difficult to set up and extend. Truck-mounted conveyors and free-standing conveyors transported by motor vehicle are often limited in length because the length that the conveyor can extend in front of and behind the vehicle while driving on public roads is limited by law.

SUMMARY OF THE INVENTION

Accordingly, there exists a significant need for a safe and versatile towable conveyor with an elevating carriage. These and other needs are addressed by the various embodiments and configurations of the present invention. Embodiments of this invention relate to a novel system, device, and method for providing a towable conveyor with an elevating carriage. The novel conveyor and carriage provided herein allow for a long conveyor that can be towed by a standard (i.e., non-CDL) truck or other towing vehicle. "CDL" refers to a vehicle that is greater than 26,000 pounds GVWR and that requires a commercial driver's license to operate the vehicle.

Thus, it is one aspect of embodiments of the present invention to provide a conveyor system that can be towed behind a vehicle without the use of a separate trailer or other towing device does not need a CDL vehicle, and does not need a wide load permit. For example, embodiments of the present invention can include a conveyor interconnected to an elevating carriage, where the elevating carriage acts as the trailer and rolls along the ground behind the towing vehicle.

It is another aspect of embodiments of the present invention to provide a conveyor system that is free-standing and does not have to lean on the structure. Thus, embodiments of the present invention include a conveyor with an elevating carriage to raise and support the freestanding conveyor.

In some embodiments, the conveyor is interconnected to the rear end of the towing vehicle. In other embodiments, the elevating carriage is interconnected to the vehicle. In various embodiments, the system includes additional components to interconnect the conveyor and/or elevating carriage to the rear end of the towing vehicle. In some embodiments, the system can comprise additional components to interconnect (either permanently or temporarily) the conveyor and elevating carriage to assist in safely towing the system.

In various embodiments of the present invention, the bottom drive end of the conveyor features a multi-position towing hitch that is integrated into the conveyor frame. This serves the purpose of having a non-removable hitch that does not interfere when the conveyor is elevated to operating positions. In some embodiments, the drive end also features two self-leveling, 360-degree swivel casters mounted to a leveling plate. The leveling plate keeps both casters on the ground when the conveyor is raised, allowing for high mobility regardless of the conveyor incline.

One aspect of embodiments of the present invention is to provide a conveyor system that is easy to maneuver at the job site and easy to raise and lower. In some embodiments, the conveyor includes handles for manually maneuvering the conveyor. The system can also include casters and/or wheels on the conveyor and/or elevating carriage for easy maneuverability and for raising the conveyor easily.

In some embodiments, the portable conveyor is designed for moving packaged or self-contained materials up to 25 ft. high. The conveyor features two revolving chains with attached flight assemblies (i.e., support elements) for carrying materials in some embodiments. In additional or alternative embodiments, the conveyor is bottom driven via a motor, a speed reducer, and a roller chain and sprocket. The conveyor is elevated via a winch, cable, and pulley mechanism. In various embodiments, the motor is an electric motor, the winch is a hand winch, and the cable is a steel cable.

It is one aspect of embodiments of the present invention to provide a conveyor system that is safe and has most moving parts (except the conveyor chains) confined within the conveyor frame. In some embodiments of the conveyors described herein, the frame comprises sheet metal paneling on all or a portion of the sides of the frame. The paneling can extend between about 1 ft. and about 8 ft. along the side of the conveyor from the end (either the top or bottom end). In preferred embodiments, the sheet metal paneling extends between about 2 ft. and about 4 ft. from each end and can extend different length from the drive end versus the idle end. The sheet metal paneling is typically provided for safety purposes, e.g., to keep people, heads, arms, hands, fingers, legs, feet, etc. out of the portions of the conveyor comprising moving parts and the portions of the conveyor where most injuries occur. The speed reducer, motor, and the roller chain and sprockets are all enclosed within the conveyor frame for safety and to facilitate installation through tight clearances, in some embodiments.

In some embodiments, the conveyor has a frame comprised of tubing. The tubing can be metal, plastic, fiber reinforced plastic, or composite material. In some embodiments, the tubing is hollow steel tubing. In other embodiments, the tubing is fiberglass or carbon fiber tubing. The frame can be a high-strength steel tubing truss conveyor frame. In some embodiments of the conveyors described herein, the conveyor frame is constructed of standard commercial quality ("CQ") steel tubing rather than the high strength ("HS") tubing generally used. This is advantageous because the CQ steel tubing is less expensive than HS tubing and the HS tubing is not necessary for all conveyors. However, some embodiments include HS tubing or a combination of CQ and HS tubing. In some embodiments, the conveyor frame has side bars or tubes, which have a larger diameter and provide much of the frame support, top bars or tubes, which have a smaller diameter and support the conveyed articles, and bottom bars or tubes, which also have a smaller diameter like the top bars or tubes. Note that the term "bottom surface" when referring to the conveyor or conveyor frame includes the entire bottom row of frame bars or tubes.

The conveyor may be controlled via remote control. A user may interact with the system via any input device such as, a keypad, keyboard, mouse, kiosk, smart phone, e-reader, tablet, laptop, Ultrabook™, personal digital assistant, handheld computer (e.g., Palm Pilot®, Blackberry®, iPhone®, iPad®, Android®), cellular phone, or the like. Similarly, the invention could be used in conjunction with any type of personal computer, network computer, work station, minicomputer, mainframe, smart phone, tablet, or the like running any operating system such as any version of Windows, MacOS, iOS, OS/2, BeOS, Linux, UNIX, Solaris, MVS, tablet operating system, smart phone operating system, or the like, including any future operating system or similar system.

In one embodiment, a towable conveyor system is provided comprising: a first towing position and a second position of use; a conveyor having a support frame, a plurality of support elements for conveying articles up the conveyor, an outer upper surface on which the articles are conveyed, a bottom surface opposite the outer upper surface, a drive end with a motor, and an idle end opposite the drive end; an elevating carriage having a first end interconnected to the support frame of the conveyor at an interconnection point, a second end opposite the first end, two or more wheels interconnected to the second end, and a support member extending upwardly from a portion of the elevating carriage between the first and second ends; a cable system for raising the conveyor into the second position of use and for lowering the conveyor into the first towing position; a first locking mechanism to releasably connect the conveyor to elevating carriage when the towable conveyor system is in the first towing position; and a connection mechanism positioned on the drive end or the idle end of the conveyor, the connection mechanism capable of detachably interconnecting the conveyor to a rear end of a towing vehicle.

In some embodiments, the first end of the elevating carriage is rotatable around the interconnection point; and the cable system comprises a second locking mechanism to lock the towable conveyor system in the second position of use. In various embodiments, the cable system comprises a hand winch with a brake, two cable pulleys, and a cable interconnected to the hand winch and the two cable pulleys. In various embodiments, the support member has a first end and a second end, wherein the first end of the support member is interconnected to the elevating carriage, wherein the second end of the support member has a support cradle that engages the bottom surface of the conveyor when the towable conveyor system is in the first towing position, wherein the first locking mechanism is interconnected to second end of the support member, wherein the first locking mechanism comprises a pin with a handle on a first end and a spring proximate a second end, and wherein the pin extends through an aperture in the support cradle. In some embodiments, the first locking mechanism comprises a pin with a first end and a second end, a T-handle on the first end of the pin, a spring and a shaft collar positioned around the pin between the first and second ends of the pin, an angle iron with a substantially horizontal portion and a substantially vertical portion, and a U-shaped handle interconnected to the substantially horizontal portion of the angle iron, wherein the pin extends through an aperture in the substantially vertical portion of the angle iron and extends through the U-shaped handle. In one embodiment, the conveyor system further comprises a detachable light system interconnected to the idle end of the conveyor or the second end of the elevating carriage; and a safety chain interconnected to the bottom surface of the conveyor and the elevating carriage. In various embodiments, the conveyor is positioned at an angle between about 20 degrees and about 65 degrees relative to the ground when the towable conveyor system is in the second position of use, and wherein the conveyor is positioned at an angle between about 5 degrees and about 20 degrees relative to the ground when the towable conveyor system is in the first towing position.

In one embodiment, a towable conveyor system is provided comprising: a second position of use and a first towing position; a conveyor having a support frame, a plurality of support elements for conveying articles up the conveyor, an outer upper surface on which the articles are conveyed, a bottom surface opposite the outer upper surface, a drive end with a motor, and an idle end opposite the drive end; an elevating carriage having a first end interconnected to the support frame of the conveyor at an interconnection point, a second end opposite the first end, two or more wheels interconnected to the second end, a center portion between the first and second ends, a first locking mechanism to releasably connect the conveyor to the elevating carriage, and two support members, wherein each support member has a first end interconnected to the center portion of the elevating carriage and a second end opposite the first end, wherein the first locking mechanism is interconnected to the second end of one of the support members; a cable system for raising the conveyor into the second position of use and for lowering the conveyor into the first towing position, wherein the cable system comprises a hand winch interconnected to the conveyor, two cable pulleys interconnected to the elevating carriage, and a cable interconnected to the hand winch and the two cable pulleys; a hitch positioned on the drive end of the conveyor, the hitch capable of detachably interconnecting the conveyor to a rear end of a towing vehicle; and a detachable light system interconnected to the idle end of the conveyor or the second end of the elevating carriage.

In various embodiments, the first end of the elevating carriage is rotatable around the interconnection point, wherein the cable system comprises a second locking mechanism to lock the towable conveyor system in the second position of use, and wherein the first locking mechanism comprises a pin with a first end and a second end, a T-handle on the first end of the pin, a spring and a shaft collar positioned around the pin between the first and second ends of the pin, an angle iron with a substantially horizontal portion and a substantially vertical portion, and a U-shaped handle interconnected to the substantially horizontal portion of the angle iron, wherein the pin extends through an aperture in the substantially vertical portion of the angle iron and extends through the U-shaped handle. In some embodiments, the towable conveyor system further comprises a safety chain interconnected to the bottom surface of the conveyor and the elevating carriage, wherein the conveyor is positioned at an angle between about 20 degrees and about 65 degrees relative to the ground when the towable conveyor system is in the second position of use, and wherein the conveyor is positioned at an angle between about 5 degrees and about 20 degrees relative to the elevating carriage when the towable conveyor system is in the first towing position.

In one embodiment, a method of conveying articles is provided comprising: providing a towable conveyor system for conveying articles, the towable conveyor system comprising: a conveyor having a support frame, a plurality of support elements for conveying articles up the conveyor, an outer upper surface on which the articles are conveyed, a bottom surface opposite the outer upper surface, a drive end with a motor, and an idle end opposite the drive end; an elevating carriage having a first end interconnected to the support frame of the conveyor at an interconnection point, a second end opposite the first end, two or more wheels interconnected to the second end, and a support member extending upwardly from a portion of the elevating carriage between the first and second ends; a cable system comprising a hand winch interconnected to the conveyor, two cable pulleys interconnected to the elevating carriage, and a cable interconnected to the hand winch and the two cable pulleys; a first locking mechanism to releasably connect the conveyor to elevating carriage; and a connection mechanism positioned on the drive end or the idle end of the conveyor; interconnecting the connection mechanism to a rear end of a towing vehicle such that the connection mechanism is in a first towing position and the towable conveyor system is in a towing position; towing the towable conveyor system; disconnecting the connection mechanism from the rear end of the towing vehicle; moving the connection mechanism into a second position; cranking the hand winch to winch the cable; moving the conveyor and/or the elevating carriage toward each other until the conveyor is in a desired position of use; and conveying the articles on the outer upper surface of the conveyor.

In various embodiments, the method further comprises pulling a handle of the first locking mechanism and releasing the conveyor from the elevating carriage before cranking the hand winch; chocking the two or more wheels, wherein the towable conveyor system further comprises a safety chain, and wherein the method further comprises securing the safety chain to the bottom surface of the conveyor at a desired safety chain length.

For purposes of further disclosure, the following references generally related to conveyors are hereby incorporated by reference herein in their entireties:

U.S. Pat. No. 10,464,754 issued to Miller et al. on Nov. 5, 2019; U.S. patent application Ser. No. 16/675,105 to Bacon-Maldonado, III et al., filed on Nov. 5, 2019; and U.S. Patent Publication No. 2019/0366902 to Bacon-Maldonado, III et al., which published on Dec. 5, 2019.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

FIG. 3 is an enlarged view of an embodiment of the support element;

FIG. 4 shows an embodiment of the towable conveyor system detached from the towing vehicle and positioned in a position of use;

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The Detailed Description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

Figure 1:
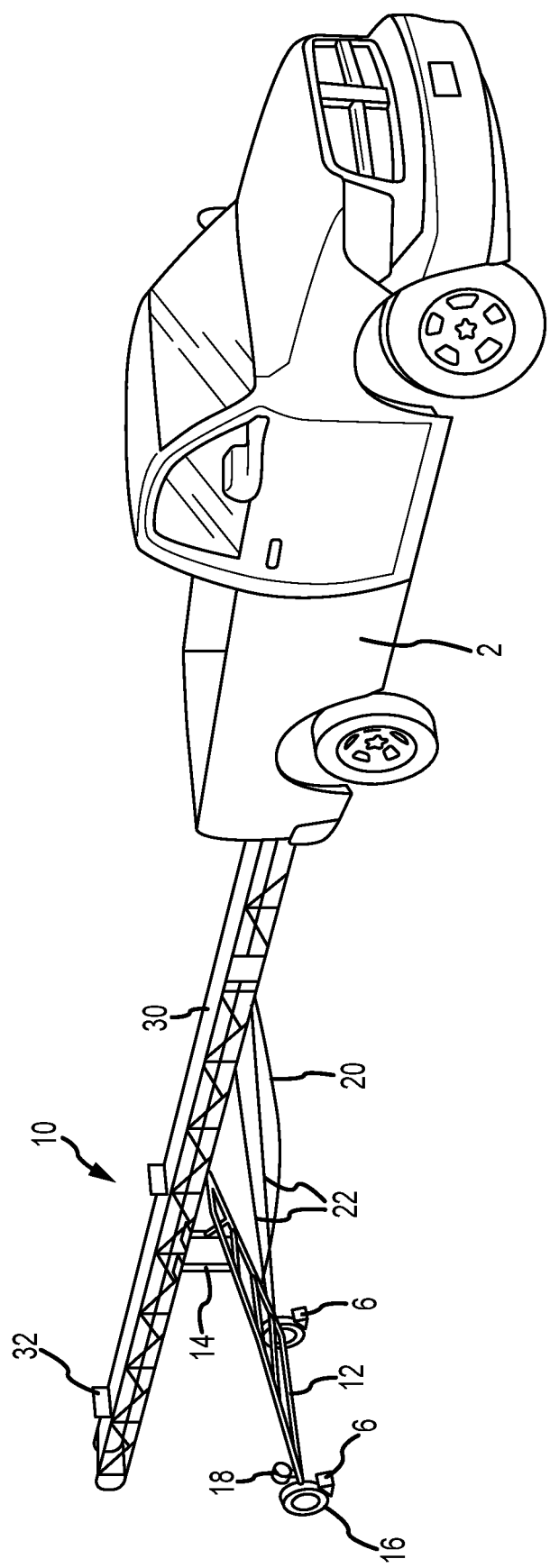
FIG. 1 shows an embodiment of the towable conveyor system interconnected to a vehicle.

FIG. 1 shows an embodiment of a towable conveyor system 10 interconnected to a vehicle 2, which may be a standard pick-up truck. The towable conveyor system 10 comprises a carriage 12, which may be called an elevating carriage, a conveyor 30, a safety chain 20 interconnected to the conveyor 30 and the elevating carriage 12, and one or more cables 22 interconnected to a winch, the conveyor 30, and/or the elevating carriage 12. The conveyor 30 comprises support elements 32 for conveying material and articles. The elevating carriage 12 comprises a first end interconnected to a bottom portion of the conveyor 30, and specifically to the conveyor frame, and a second end opposite the first end. The second end of the elevating carriage 12 has two wheels 16, which can be tires in some embodiments. The wheels 16 are chocked using chocks 6. The elevating carriage 12 also includes a support cradle or conveyor cradle 14. The support cradle 14 includes two arm members in some embodiments. The conveyor system 10 further includes lights 18, which can be positioned on the conveyor 10 and/or the elevating carriage 12.

Figure 2:
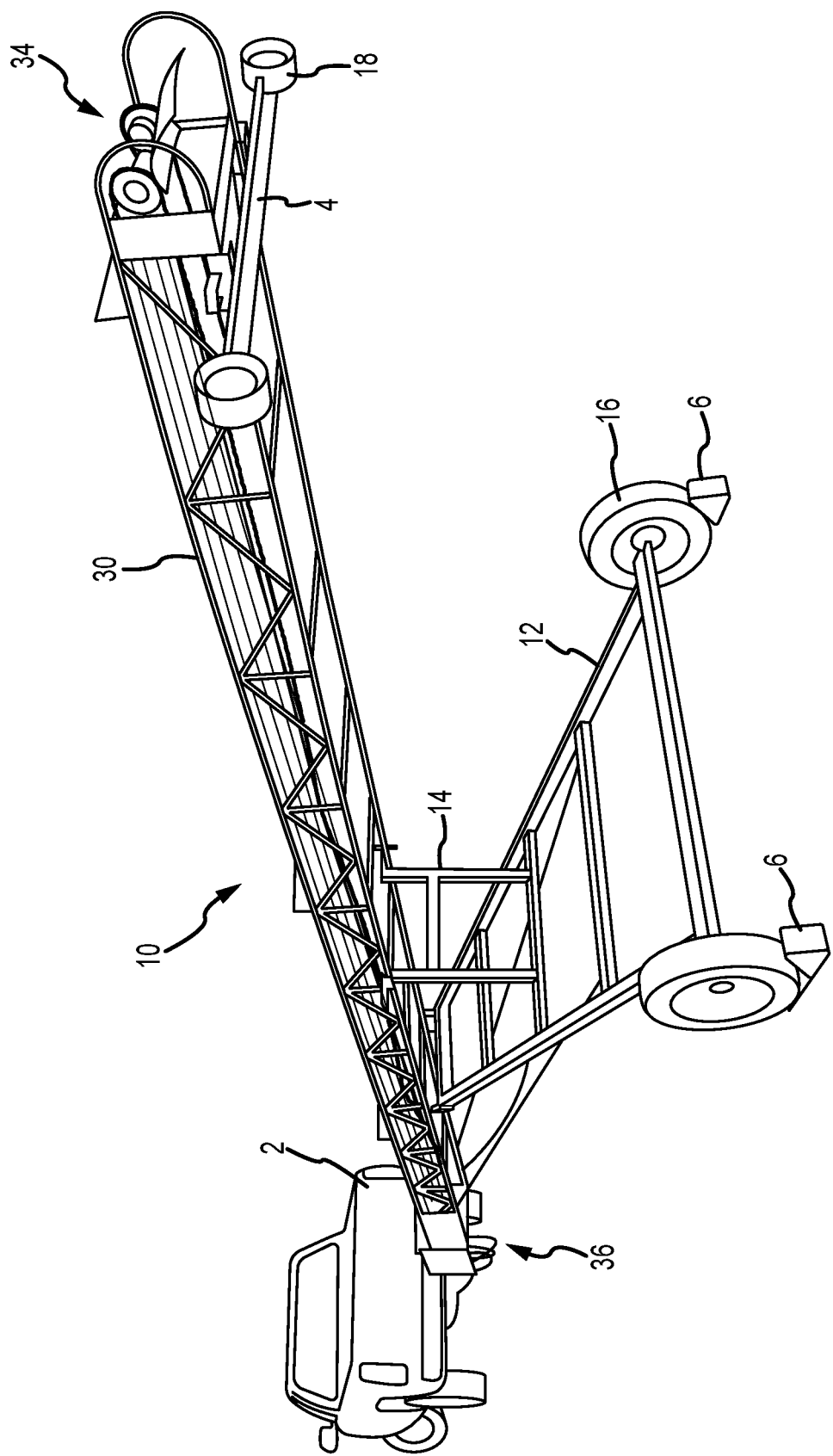
FIG. 2 shows an embodiment of the towable conveyor system interconnected to a vehicle.

FIG. 2 shows an embodiment of a towable conveyor system 10 interconnected to a vehicle 2. The conveyor 30 has a drive end 36 and an idle end 34. The ends of the conveyor 30 may be called first and second ends herein to refer to an end generally. In the embodiment shown, the drive end 36 is interconnected to the vehicle 2. However, in other embodiments, the idle end 34 may be connected to the vehicle 2. A light assembly 4 is interconnected to the idle end 34 of the conveyor 30 and the light assembly 4 includes two lights 18. If the idle end 34 of the conveyor 30 is interconnected to the vehicle 2, then the light assembly 4 would be interconnected to the drive end 36 of the conveyor 30 such that it is connected to the end away from the vehicle 2. During towing, the conveyor 30 is interconnected to the carriage 12 and/or supported by the support cradle 14. Thus, an upper end of each arm of the support cradle 14 is interconnected to the bottom of the conveyor 30. Once the vehicle 2 is at the desired location, the wheels 16 of the carriage 12 are chocked using chocks 6.

FIG. 3 is an enlarged view of an embodiment of the support element 32, which conveys articles and materials along the conveyor 30. In some embodiments, the support elements 32 are padded steel flights. In one embodiment, the support elements 32 extend a height above the conveyor 30 surface between about 3.0 inches and about 6.0 inches. In a preferred embodiment, the support elements 32 are 4-inch high padded steel flights. In some embodiments, the support elements 32 also include a portavator pad 40 ahead of each flight or support element 32. The portavator pads 40 are typically used for conveying tile. The portavator pads 40 are substantially perpendicular to the flights; thus, the portavator pads 40 are substantially parallel to the outer surface of the conveyor 30. The portavator pads 40 can have a width between about 50% and about 90% of the width of the conveyor 30. In some embodiments, the portavator pads 40 extend a length along the conveyor 30 (i.e., in the direction of conveyor travel) between about 8.0 inches and about 24.0 inches.

The conveyor 30 comprises one or more conveyor chains 48, which can be seen in FIG. 3. The conveyor 30 has two chains 48 in some embodiments, while the conveyor 30 may only have one chain 48 in other embodiments or more than two chains 48 in still other embodiments. The portavator pads 40 and the flights 32 are interconnected to the chains 48. In some embodiments, portavator pads 40 and the flights 32 are releasably interconnected to the chains 48 via fasteners, for example, bolts, such that they can be removed for repair, replaced, or moved to accommodate more or few support elements 32. However, other known interconnection means can be used in other embodiments. Each chain 48 is positioned in a track 38 to keep the chain 48 in the desired position and prevent the chain from twisting. The chains 48 can be continuously revolving detachable chains in some embodiments. In various embodiments, the chain 48 is an agricultural steel detachable chain, and can be item #55 made by Allied-Locke Industries. The chains 48 rotate around the conveyor at a constant speed ranging between about 40 FPM (feet per minute) and about 100 FPM. In a preferred embodiment, the chains 48 rotate around the conveyor at a constant speed of about 80 FPM.

FIG. 4 shows an embodiment of a towable conveyor system 10 detached from the towing vehicle and positioned in a position of use. Here, the drive end 36 of the conveyor 30 is positioned proximate the ground, but the conveyor 30 could be reversed in other embodiments with the idle end 34 at the bottom of the conveyor 30 proximate the ground. The bottom end 36 of the conveyor 30 comprises an integrated trailer hitch 50 for towing the system 10. The hitch 50 can be a ball hitch or a pintle hitch or other known hitches. The hitch 50 is interconnected to the conveyor via arm members. An upper arm member is movable such that the hitch 50 has a first towing position and a second upright position for conveying articles. The bottom end 36 also includes one or more casters 52. The casters 52 may be self-leveling casters 52 mounted to an auto-leveling plate. In additional or alternative embodiments, the casters 52 may be swivel casters for easy jobsite maneuverability, may be removeable, and/or may have a locking mechanism to prevent the casters 52 from rolling.

In some embodiments, the loading (i.e., bottom) end of the conveyor 30 may have one or more support stands that rest on the ground instead of casters such that the loading end is stationary and cannot roll. The support stand is positioned on the ground and may have an adjustable angle depending on the desired final angle of the conveyor 30.

The conveyor 30 comprises at least one chain 48 and a plurality of support elements 32. One support element 32 is shown conveying an article 42. In various embodiments, the elevating carriage 12 includes a support cradle 14 with two support arms 15 and a perpendicular bar 28 extending from one support arm 15 to the other. The perpendicular bar 28 is substantially perpendicular to each support arm 15. The distal end of each support arm 15 includes a locking mechanism 44 in some embodiments. In other embodiments, only one support arm 15 includes a locking mechanism 44. The locking mechanism 44 locks the conveyor 30 to the elevating carriage 12 such that the conveyor 30 does not bounce up and down on the support cradle 14 when the system 10 is being towed. The locking mechanism 44 can be a spring-loaded locking mechanism with a handle 46 in various embodiments. Other embodiments can include only one support arm 15.

The towable conveyor system 10 further comprises a winch 68 for winching a cable 22 to raise and lower the conveyor 30. The cable 22 extends from a fixed location on the bottom surface of the conveyor 30 to a first cable pulley and then to a second cable pulley and then to the winch 68. The winch 68 can be an hand winch with a handle for cranking the winch 68 or the winch 68 can be an electric winch with a motor. The winch 68 has a built-in brake such that when there is tension on the cable 22, the brake does not permit the cable 22 to be released from the winch 68 unless the winch 68 is moved in the reverse direction, i.e., the handle is rotated in the opposite direction or the user switches the electric winch into the reverse operating mode. As the winch 68 is cranked, the cable 22 winds up onto a spool and raises the conveyor 30 by shortening the distance of the cable 22 between the elevating carriage 12 and the conveyor 30. The winch 68 and cable 22 lock the conveyor 30 in the upright position of use at the desired height and angle. The cable 22 may be a steel wire rope in some embodiments. Other embodiments may have two cables and two winding spools, or one spool with a partition between the two winding portions for the two cables.

The system 10 also includes a safety chain 20, which may be a coil chain in some embodiments. The safety chain 20 is interconnected on a first end to the elevating carriage 12 and is interconnected at another point on the chain 20 to the bottom of the conveyor 30. The first end of the safety chain 20 may be permanently interconnected to the elevating carriage 12 or the first end of the safety chain 20 can have a releasing mechanism to attach and detach from the elevating carriage 12, for example, a hook, a carabiner, or a clip. In some embodiments, the chain 20 connects to the conveyor 30 via a keyhole mechanism, where the chain 20 is put through a keyhole and the keyhole mechanism allows the user to lock the chain 20 at the desired length. Thus, the chain 20 length is freely adjustable and can be locked at a position under tension when the conveyor 30 is in the desired position. The chain 20 is for safety purposes and provides a back-up locking mechanism to lock the conveyor 30 in the position of use and to prevent the conveyor 30 from falling if the cable 22 breaks or comes out of tension.

Figure 5:
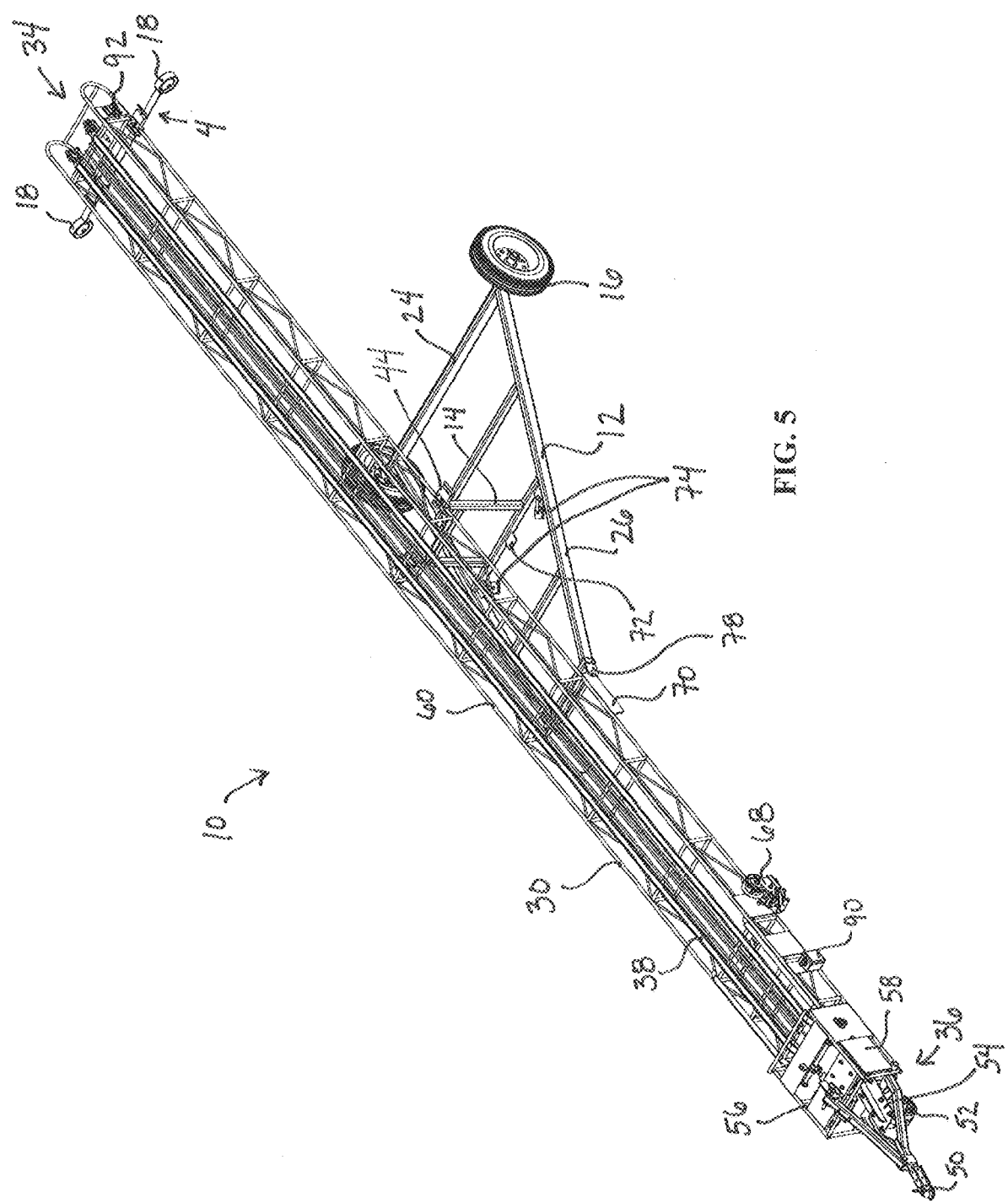
FIG. 5 shows an embodiment of the towable conveyor system in a second position, i.e., after being detached from the towing vehicle.

FIG. 5 shows an embodiment of the towable conveyor system 10 in a second position, i.e., after being detached from the towing vehicle and with the hitch 50 in the first towing position. The towable conveyor system 10 comprises a conveyor 30 and an elevating carriage 12. The conveyor 30 has a frame 60 comprised of tubing. The frame 60 has longitudinal side bars or side tubes, which have a larger diameter and provide much of the frame support, longitudinal top bars or tubes, which have a smaller diameter and support the conveyed articles, and longitudinal bottom bars or tubes that have a smaller diameter similar to the top longitudinal bars or tubes. The conveyor frame 60 can also include perpendicular bars or tubes on the top, bottom, and/or sides of the conveyor. Further, the sides of the frame 60 may also have diagonal bars or tubes.

The conveyor 30 includes tracks 38 for the chains. The tracks 38 run longitudinally along the conveyor 30. The conveyor 30 has a secondary start/stop switch 92 and a detachable light assembly 4 with lights proximate the idle end or the discharge end 34. The opposite end 36, i.e., the drive end or the loading end, includes the hitch 50 interconnected to the conveyor 30 via arm members. An upper arm member is movable such that the hitch 50 has a first towing position (shown in FIG. 5) and a second upright position for conveying articles (shown in FIG. 7). The bottom end 36 also includes one or more casters 52. The casters 52 may be self-leveling casters 52 mounted to an auto-leveling plate 54. In additional or alternative embodiments, the casters 52 may be swivel casters for easy jobsite maneuverability. The casters 52 may be removeable and/or may have a locking mechanism to prevent the casters 52 from rolling. The drive end 36 includes the motor and an enclosure 56 for enclosing the motor and speed reducer and also includes a roller chain guard 58. The conveyor 30 has an up/stop/down switch 90 positioned proximate the load end 36.

The elevating carriage 12 comprises longitudinal frame members 26 and horizontal or perpendicular frame members 24 extending between the longitudinal frame members 26. The elevating carriage 12 has a first end interconnected to the conveyor frame 60 at an interconnection point 78. Specifically, the first end of the elevating carriage 12 is interconnected to a carriage mounting ear 70 that is secured to the conveyor frame 60. The second end of the elevating carriage 12 comprises one or more wheels 16. The elevating carriage 12 includes a support cradle 14 for securely holding the conveyor 30 in the towing position via one or more locking mechanisms 44. Additionally, one horizontal or perpendicular frame member 24 proximate a center of the elevating carriage 12 has a safety chain mount point 72 to which one end of the safety chain is secured.

The conveyor 30 also includes a winch 68 with a built-in brake. The winch 68 can be a hand winch or an electric winch. The winch 68 is interconnected to a cable attached to the elevating carriage 12 via one or more cable pulleys 74. The winch 68 and cable system are similar to other winches and cable systems described elsewhere herein.

Figure 6:
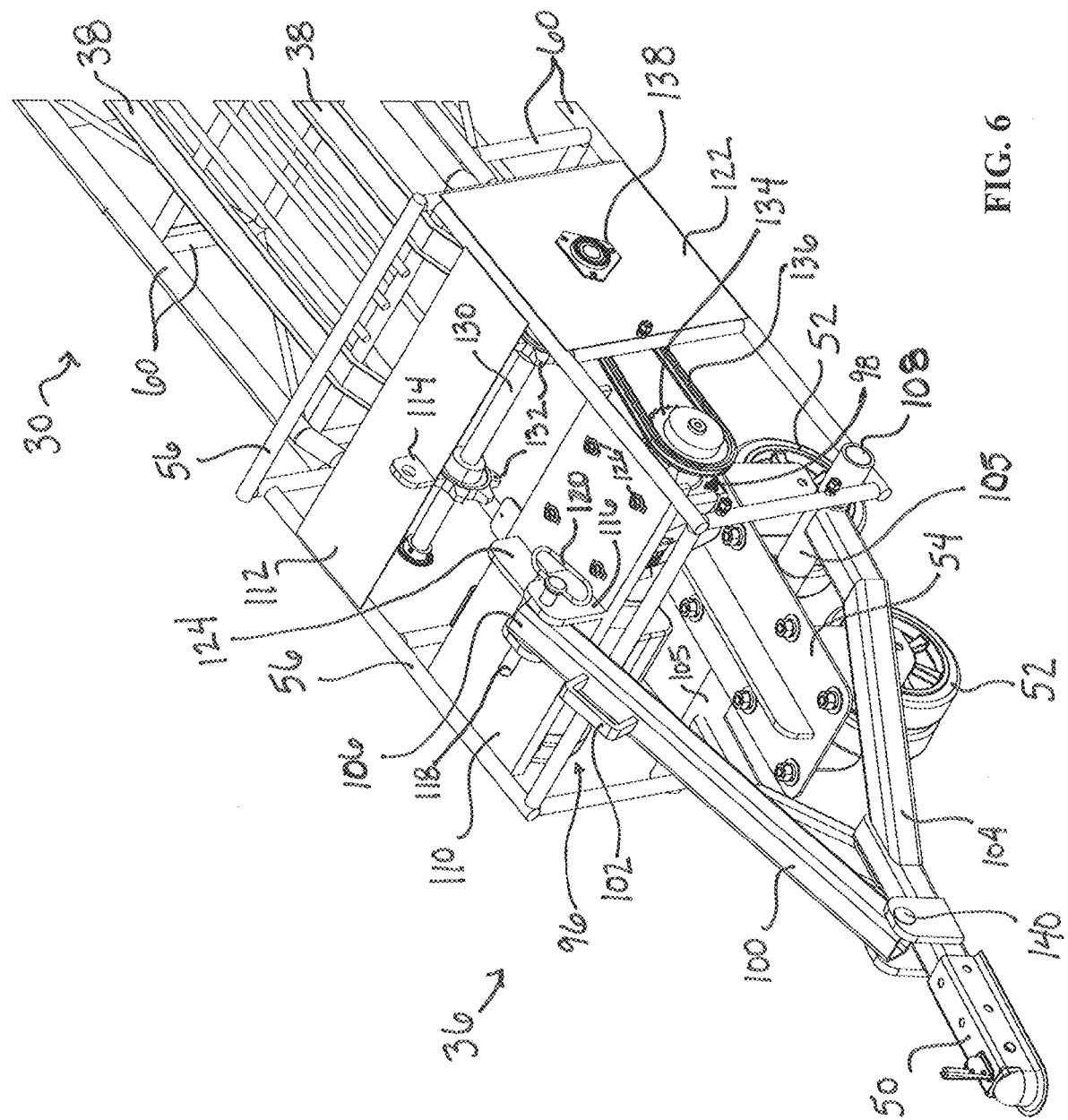
FIG. 6 is an enlarged view of the drive end (or bottom) of the conveyor of FIG. 5 with the hitch shown in a first towing position.
Figure 7:
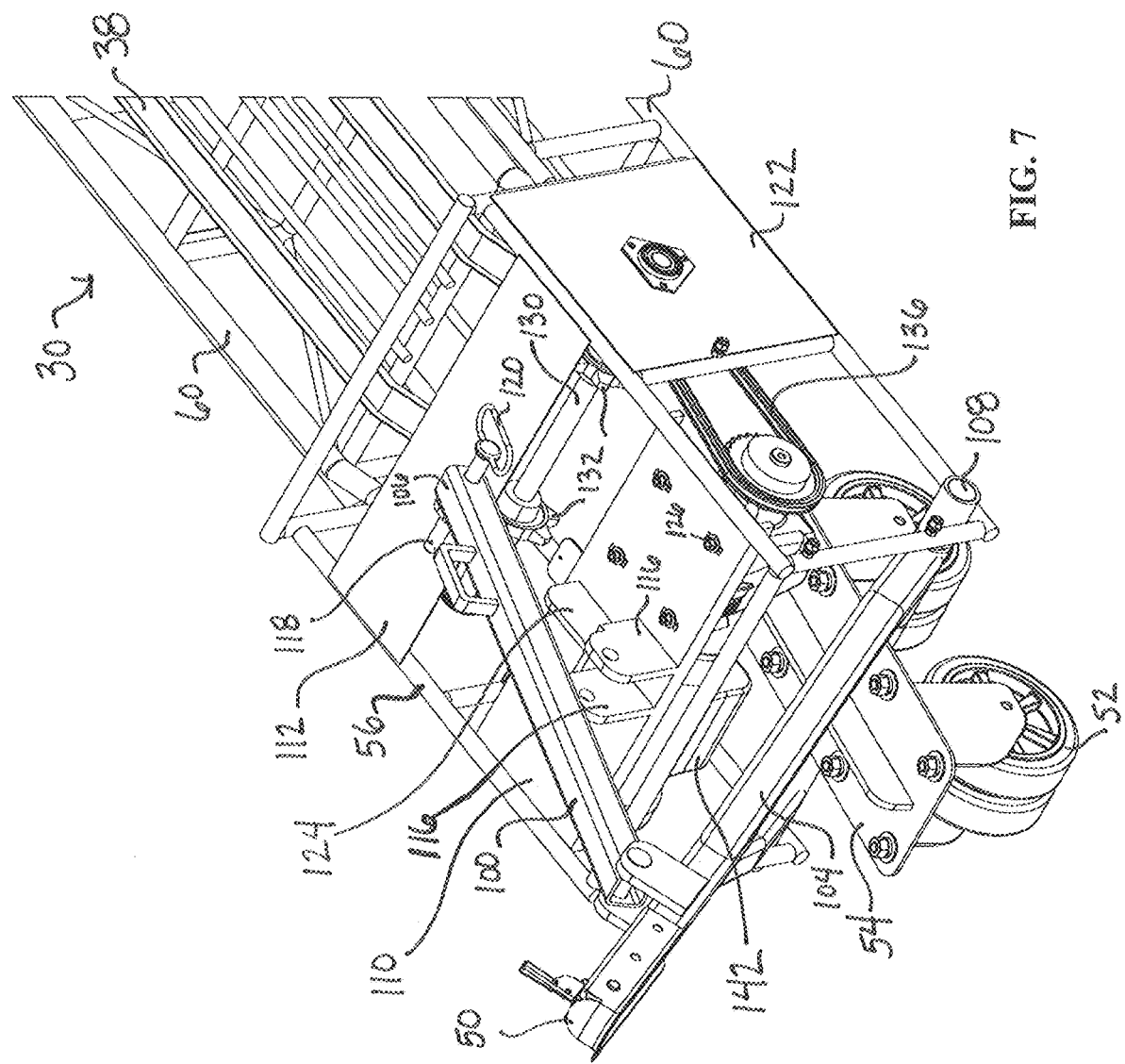
FIG. 7 shows the drive end of the conveyor of FIG. 6 after the hitch has been moved into a second upright position.

FIG. 6 is an enlarged view of the drive end or load end 36 of the conveyor 30 of FIG. 5 with the hitch 50 shown in the first towing position. FIG. 7 also shows the drive end 36 of the conveyor 30, but with the hitch 50 in a second upright position. The components of FIGS. 6 and 7 are the same and will be discussed together.

The drive end 36 of the conveyor 30 includes an enclosure 56 for the motor. The roller chain guard has been removed for these figures such that the internal components can be seen. The enclosure 56 includes one or more top mounting plates 110, 112. The speed reducer is mounted to an under side of the first mounting plate 110 via the fasteners 126. The upper surface of the first mounting plate 110 includes two hitch mounting ears 116 and a structural support gusset 124 for securing the hitch 50 to the conveyor 30 in the first towing position. Specifically, the hitch 50 includes an upper support arm 100 and two side support arms 104. In the hitch first position (FIG. 6), i.e., the hitch towing position, the distal end 106 of the upper support arm 100 is interconnected to the two hitch mounting ears 116 via a locking pin 118 with a handle 120. The upper surface of the second mounting plate 112 includes one or more hitch mounting ears 114. In the hitch second position (FIG. 7), i.e., the upright hitch position, the distal end 106 of the upper support arm 100 is interconnected to the hitch mounting ear 114 via the locking pin 118. The distal end 106 of the upper support arm 100 includes an aperture through which the locking pin 118 extends. The hitch mounting ears 116 on the first mounting plate 110 and the hitch mounting ear 114 on the second mounting plate 112 also include apertures through which the locking pin 118 extends to lock the hitch 50 in the desired position. The locking pin 118 can be removed from the upper support arm 100 and hitch mounting ears 114, 116 by pulling on the pin's handle 120. The upper support arm 100 includes a handle 102 for moving the upper support arm 100 from the first towing position to the second upright position. Because the hitch 50 can move from the first towing position to the second upright position where it does not interfere with the conveyor 30 elevating process, the hitch 50 can be integrated into and permanently secured to the conveyor frame 60.

The casters 52 are mounted to the caster leveling plate 54, which rotates freely around a pivot rod 108. When the conveyor 30 is elevated, the caster leveling plate 54 stays level with both casters 52 remaining on the ground. The pivot rod 108 is mounted on two pipes or bars, which can be a part of the motor enclosure 56 and are fixed to the conveyor frame 60. The pivot rod 108 also allows the hitch 50 to rotate freely because the distal ends of the two side support arms 104 have tube-like connectors 105 that surround the pivot rod 108 and rotate around the pivot rod 108.

The drive end 36 of the conveyor 30 includes the motor 96, which means that the drive end 36 also includes the drive shaft 130. The drive shaft 130 is interconnected to and held in place via the ball bearing flangette housing 138 and side panel 122. The drive shaft 130 has a sprocket (not shown) proximate the inside of the side panel 122. The drive shaft sprocket is fixedly secured to the drive shaft 130 and the drive shaft sprocket is interconnected to a roller chain 136. The opposite end of the roller chain 136 is interconnected to a speed reducer sprocket 134. The speed reducer sprocket 134 is mounted to the speed reducer gearbox 98, which is mounted to the motor 96. The motor 96 can be an electric motor in some embodiments. The speed reducer 98 is mounted to the mounting plate 110 via the one or more fasteners 126 (e.g., bolts). The fasteners 126 are mounted in slots that provide the means for tensioning the roller chain 136. The roller chain 136 transmits power from the motor 96 to the drive shaft 130. SDC (steel detachable chain) sprockets 132 are fixedly interconnected to the drive shaft 130 and drive the chains (48 in other figures). Each conveyor chain (which may be an SDC) is interconnected to an SDC sprocket 132. The SDC sprockets 132 drive the chains and conveyor flights or support elements. The capacitor housing 142 of the motor is visible in FIGS. 6 and 7.

In some embodiments, the conveyor 30 has an in-line gearmotor and speed reducer combination. Further, the drive assembly is enclosed in the frame 60 and/or enclosure 56 in some embodiments. Ideally, the electric gearmotor 96, 98, roller chain 136, and sprocket 134 are fully contained within the enclosure 56 and/or conveyor frame 60.

Figure 8:
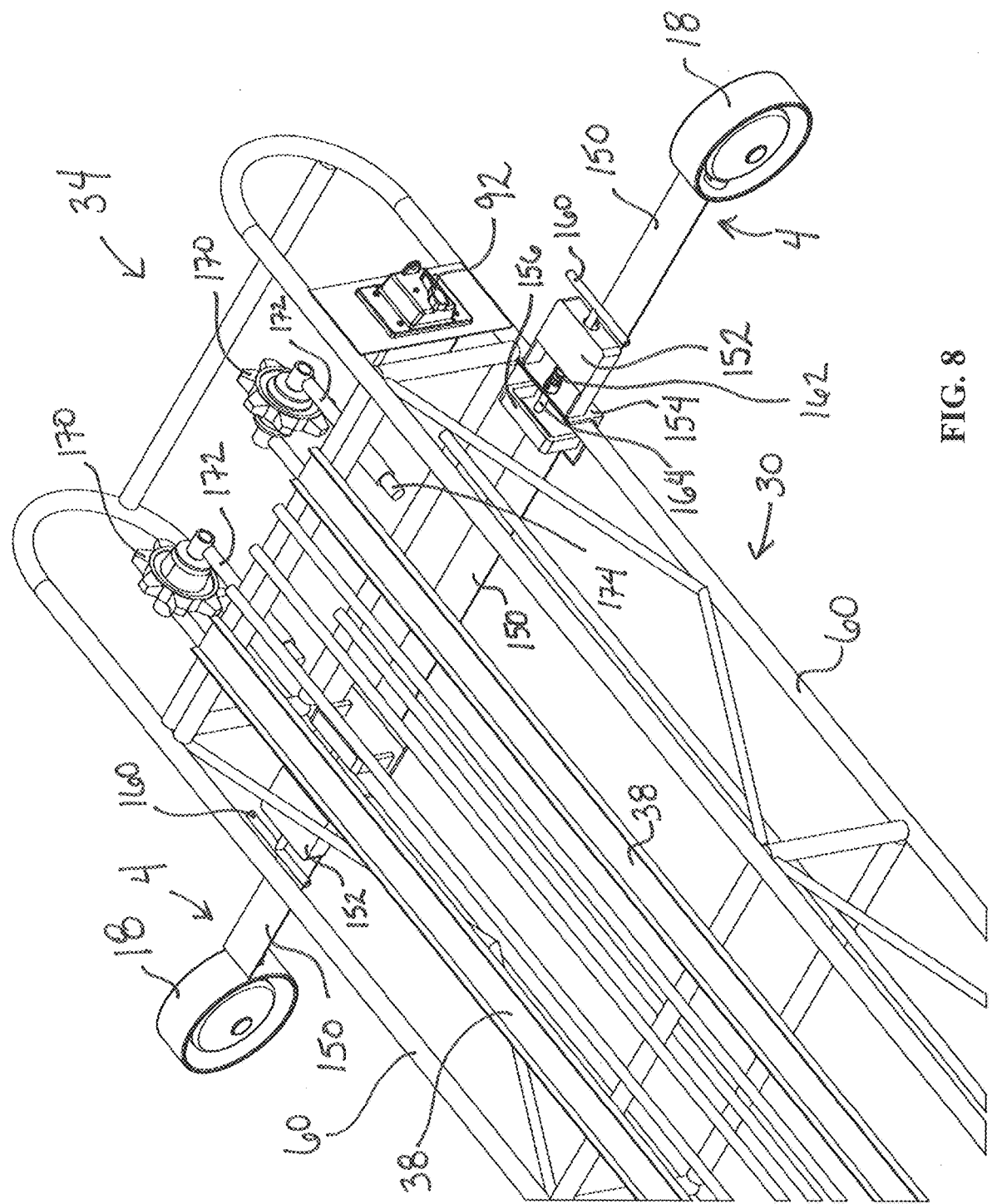
FIG. 8 is an enlarged view of the idle (or top) end of the conveyor of FIG. 5.

FIG. 8 is an enlarged view of the idle end or discharge end 34 of the conveyor 30. The idle end 34 comprises a detachable light assembly 4, which includes two lights 18 interconnected to a support bar 150 interconnected to the locking mechanisms 152, one on each side of the conveyor 30. The locking mechanisms 152 are similar to the locking mechanisms 44 described elsewhere herein and can be spring-loaded locking mechanisms. The locking mechanisms 152 each comprise a locking pin 164 with a T-handle 160 on a first end and a second end opposite the first end, a spring 162 and a shaft collar positioned around the pin 164 between the first and second ends of the pin 164, an angle iron 154 with a substantially horizontal portion and a substantially vertical portion, and a U-shaped handle 156 interconnected to the substantially horizontal portion of the angle iron 154. The locking pin 164 extends through an aperture in the substantially vertical portion of the angle iron 154, over the top of the conveyor frame tube 60, and through the U-shaped handle 156. The support bar 150 is secured to the bottom of the angle iron 154. The locking mechanism 152 is released by pulling the handle 160 outward such that the pin 164 is no longer positioned above the conveyor frame tube 60. Thus, the light assembly 4 is detachable from the conveyor 30 and conveyor frame 60 via the spring-loaded locking mechanisms 152.

The idle end 34 includes idler sprockets 170 interconnected to the steel detachable chain (not shown in this figure, but item 48 in other figures). The idler sprockets 170 spin freely (i.e., they are not interconnected to a perpendicular bar or shaft) and provide tension adjustment for the chains (48). The idler sprockets 170 are also a part of the chain take-up adjustment system. The idler sprockets 170 are mounted to adjustable rods 172, which are threaded on their distal ends 174. The threaded ends 174 interconnect to nuts connected to a portion of the conveyor frame 60. The adjustable rods 172 can be screwed into or out of the nuts to lengthen or shorten the adjustable rods 172 and, thus, bring the idler sprockets 170 in toward the conveyor 30 or out away from the conveyor 30 to tension the chains (48). There is one idler sprocket 170 per chain (48).

Figure 9:
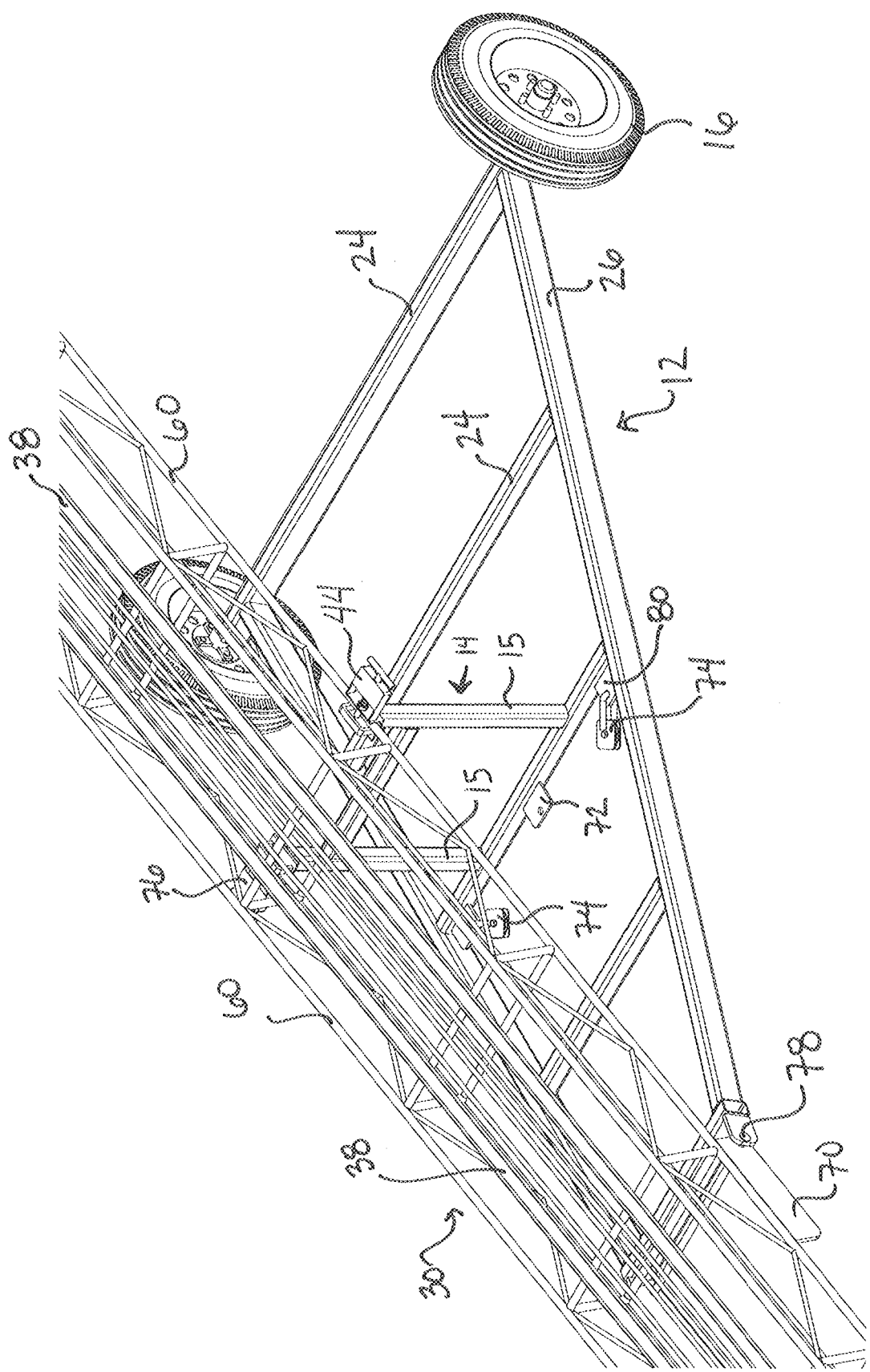
FIG. 9 is an enlarged view of the center portion of the towable conveyor system of FIG. 5, which includes the towable elevating carriage and the center portion of the conveyor.
Figure 10:
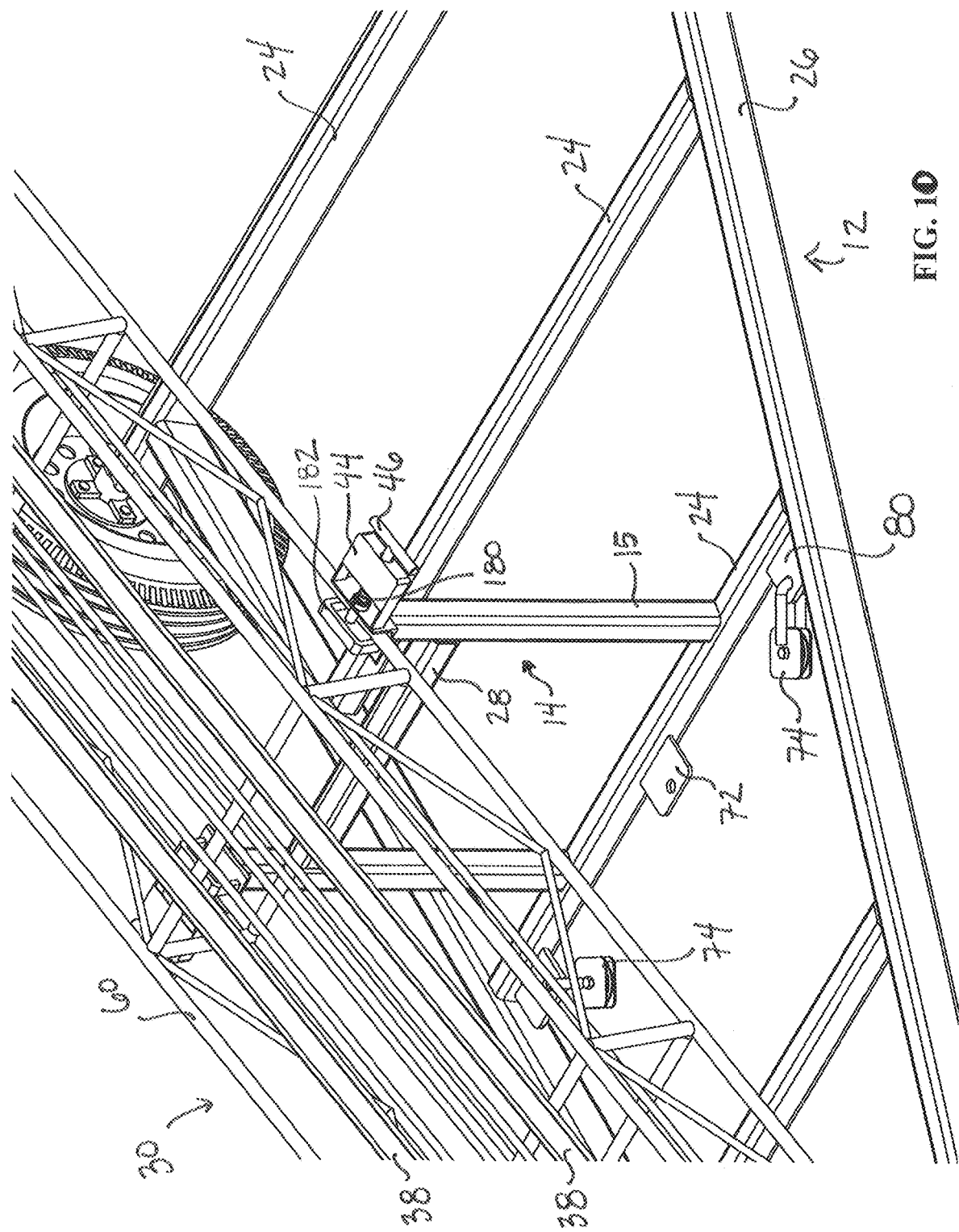
FIG. 10 is an enlarged view of the center portion of the towable conveyor system of FIG. 5.

FIGS. 9 and 10 are enlarged views of the center portion of the towable conveyor system of FIG. 5. Here, the cable pulleys 74 can clearly be seen, as they are interconnected to the elevating carriage 12 via mounting plates or mounting ears 80. The elevating carriage 12 includes a support cradle 14 with two upwardly extending support arms 15 and a perpendicular bar 28 extending from one support arm 15 to the other. The perpendicular bar 28 is substantially perpendicular to each support arm 15. In some embodiments, the support cradle 14 only has one upwardly extending support arm 15. The distal end of each support arm 15 includes a locking mechanism 44 in some embodiments. The locking mechanism 44 locks the conveyor 30 to the elevating carriage 12 such that the conveyor does not bounce up and down on the support cradle 14 when the system 10 is being towed. Specifically, the conveyor 30 rests on the support cradle 14 when in the towing position and the locking mechanism 44 is essentially a pin that grabs the bottom rail of the conveyor frame 60 and prevents the conveyor 30 from elevating. The pin can be pulled by pulling on the handle 46 to release the conveyor 30. The locking mechanism 44 can be a spring-loaded locking mechanism with a locking pin, a handle 46, a spring 180 and a shaft collar positioned around the pin, an angle iron with an aperture, and a U-shaped handle 182 in various embodiments. The locking mechanism 44 can be similar to the locking mechanism 152 described in connection with the light assembly.

Figure 11:
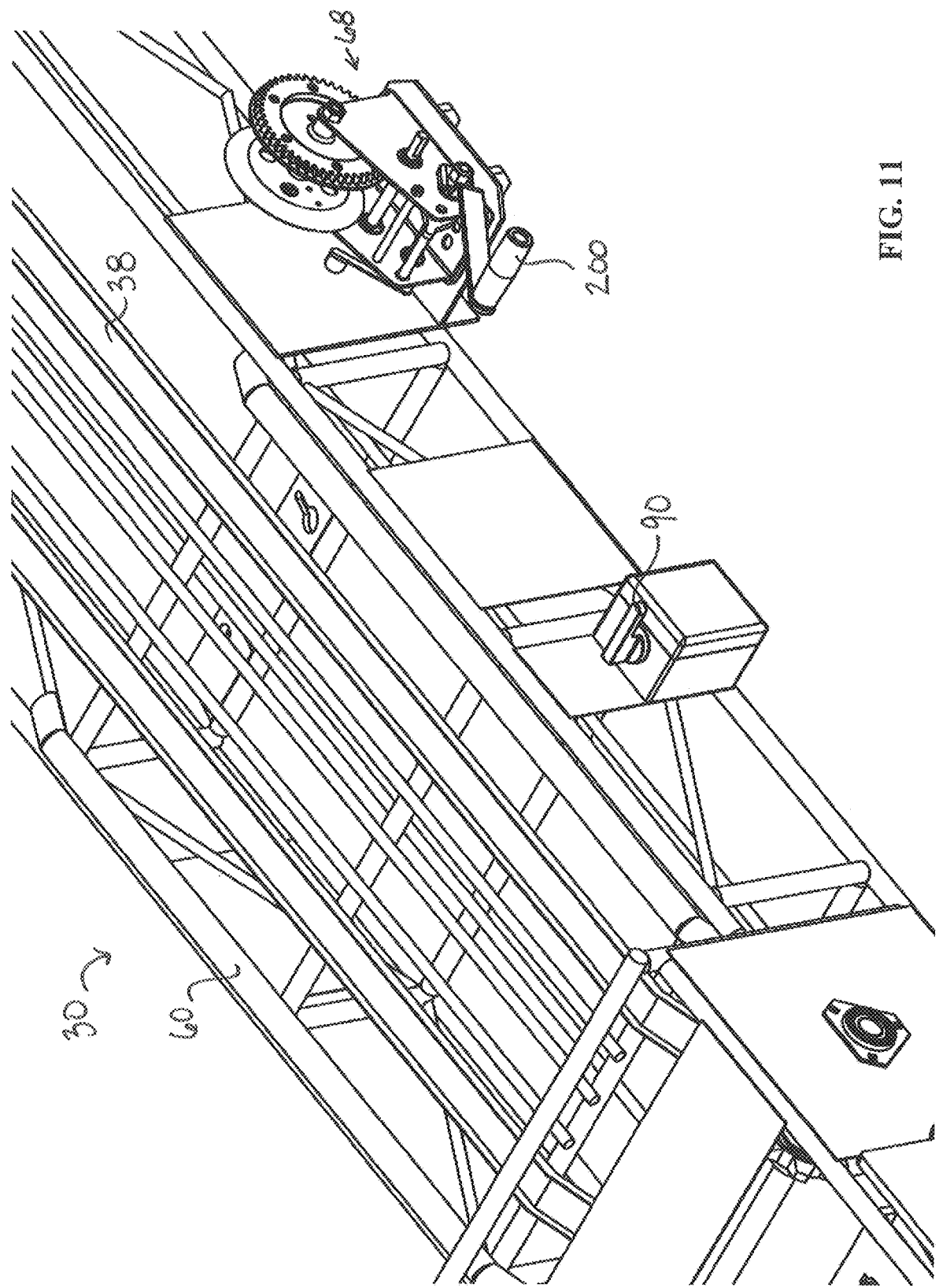
FIG. 11 is an enlarged view of a portion of the conveyor of FIG. 5 proximate the drive end.

FIG. 11 is an enlarged view of a portion of the towable conveyor system 10 of FIG. 5 proximate the drive end of the conveyor 30. The conveyor 30 comprises a winch 68 with a built-in brake for winching the cable interconnected to the elevating carriage. In some embodiments, the winch 68 is a hand winch and includes a handle 200 for cranking the winch 68. The winch 68 can be turned in either direction to either shorten or length the cable and raise or lower the conveyor 30, respectively.

Figure 12:
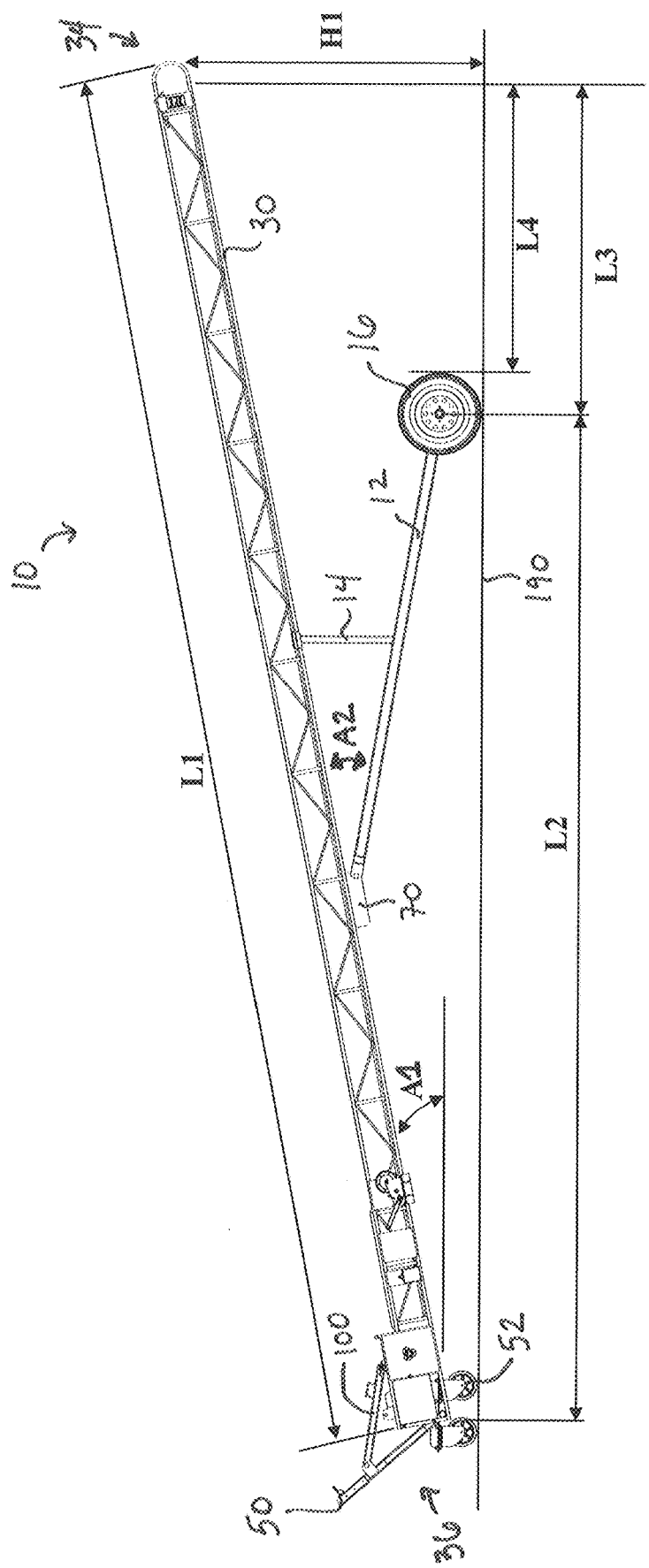
FIG. 12 shows an embodiment of the towable conveyor system in a third position, i.e., after being detached from the towing vehicle and with the hitch in a second upright position.
Figure 13:
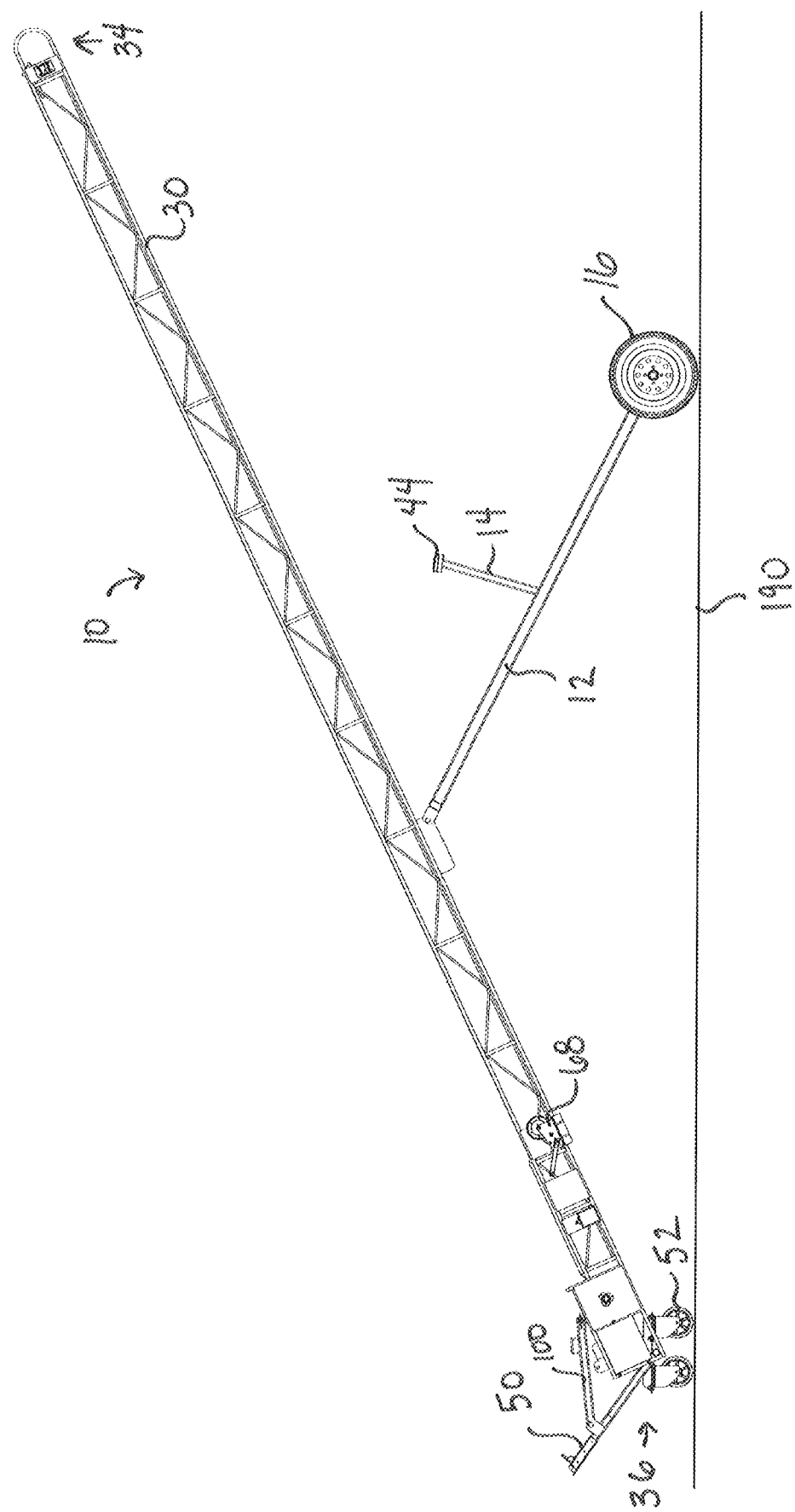
FIG. 13 shows an embodiment of the towable conveyor system in a fourth position, i.e., as the conveyor is being raised.
Figure 14:
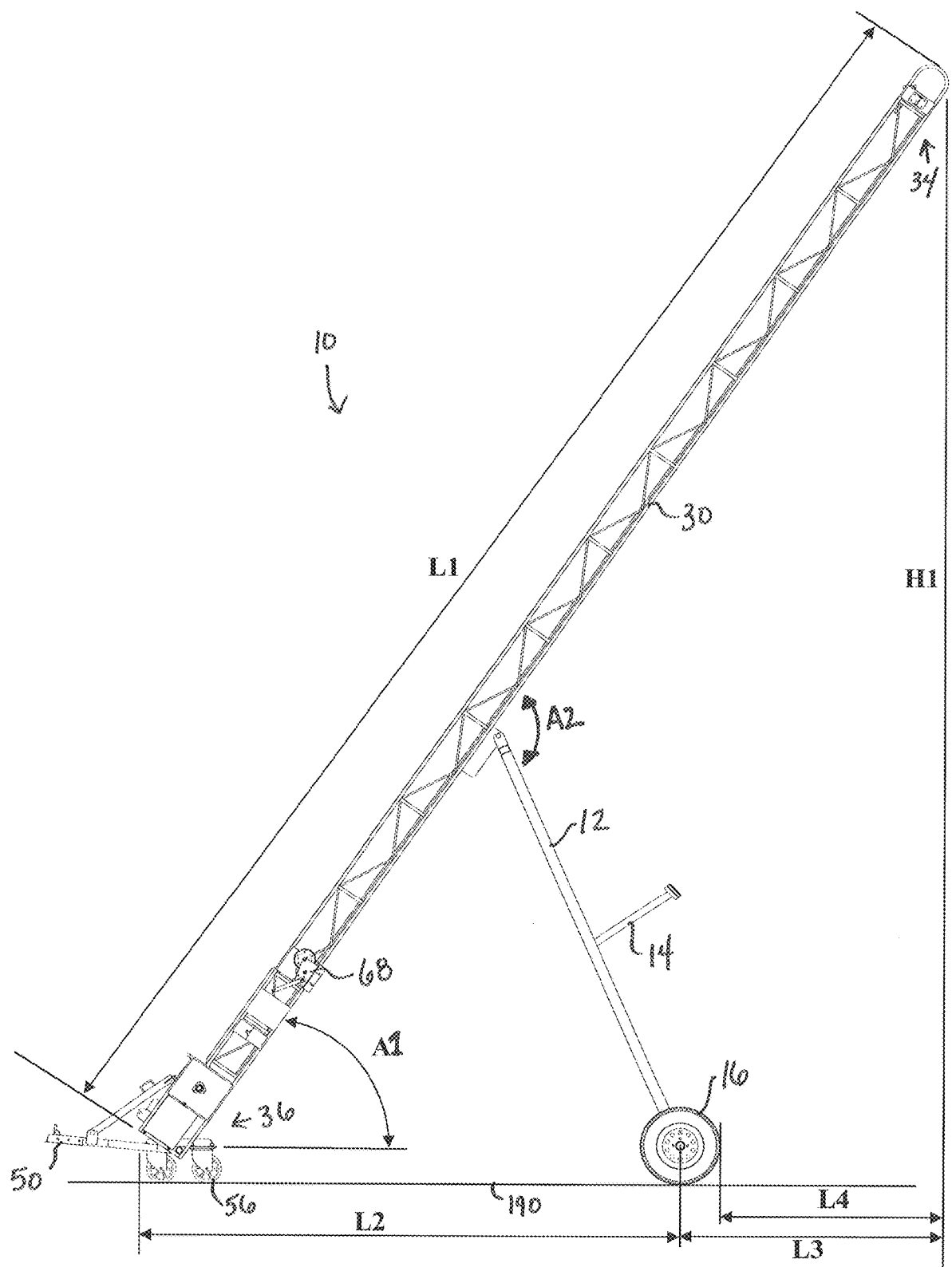
FIG. 14 shows an embodiment of the towable conveyor system in an extended position of use.

FIG. 12 shows an embodiment of the towable conveyor system 10 in a third position, i.e., after being detached from the towing vehicle and with the hitch 50 in a second upright position. FIG. 13 shows the towable conveyor system 10 in a fourth position, i.e., as the conveyor 30 is being raised. FIG. 14 shows the towable conveyor system 10 in an extended position of use. Thus, FIGS. 12-14 show the conveyor raising process.

In one embodiment of the conveyor raising process, the first step is to release the conveyor hitch from the vehicle. To do this, the user uses a jack (which is a separate piece) to lift the hitch off of the ball of the vehicle's hitch mount. Next, the user lowers the jack until the casters on the loading end of the conveyor hit the ground. Then the user changes hitch position from the towing (first) position shown in FIG. 6 to the upright (second) position for conveying articles shown in FIG. 7. The user then unlocks the support cradle locking mechanism by pulling on the T-handles to release the conveyor frame. The user can chock or lock either the casters or the carriage wheels before operating the winch, or the user can chock or lock the casters and/or the carriage wheels after the conveyor is raised into the desired position of use. At this point, the user can freely hand winch (or turn on the electric winch) the cable to bring the elevating carriage toward the conveyor. As the user cranks the hand winch (or runs the electric winch), the conveyor begins to raise by the wheels and/or casters rolling along the ground. Once the conveyor is in the desired position, the user should stop cranking the winch. Additionally, the user should secure the safety chain to the conveyor at the desired chain length using the keyhole mechanism or other chain securing mechanism. To lower the conveyor, the steps are repeated in the opposite order and the winch is operated in the opposite direction.

In the third position (FIG. 12), in some embodiments, the angle A between the conveyor 30 and the ground 190 (or a plane parallel to the ground 190 and in line with the caster leveling plate) is between about 5° and about 20°. In a preferred embodiment, the angle A is about 12°. In some embodiments, the length L1 of the conveyor 30 is between about 27 feet and about 35 feet; the length L2 from the conveyor load end 36 to the center of the wheel 16 is between about 240 inches and about 300 inches; the length L3 from the center of the wheel 16 to the discharge end 34 of the conveyor 30 is between about 85 inches and about 110 inches; the length L4 from the rear edge of the wheel 16 to the discharge end 34 of the conveyor 30 is between about 75 inches and about 95 inches, and the height H1 of the discharge end 34 above the ground 190 is between about 6 feet and about 8 feet. In one preferred embodiment, the length L1 of the conveyor 30 is about 31 feet, the length L2 from the conveyor load end 36 to the center of the wheel 16 is about 265 inches, the length L3 from the center of the wheel 16 to the discharge end 34 of the conveyor 30 is about 97 inches, the length L4 from the rear edge of the wheel 16 to the discharge end 34 of the conveyor 30 is about 86 inches, and the height H1 of the discharge end 34 above the ground 190 is about 7'-1". In some embodiments, the length L1 of the conveyor 30 is between about 20 feet and about 30 feet; the length L2 from the conveyor load end 36 to the center of the wheel 16 is between about 240 inches and about 300 inches; the length L3 from the center of the wheel 16 to the discharge end 34 of the conveyor 30 is between about 25 inches and about 45 inches; the length L4 from the rear edge of the wheel 16 to the discharge end 34 of the conveyor 30 is between about 15 inches and about 35 inches, and the height H1 of the discharge end 34 above the ground 190 is between about 5 feet and about 7 feet. In one preferred embodiment, the length L1 of the conveyor 30 is about 25'-8", the length L2 from the conveyor load end 36 to the center of the wheel 16 is about 265 inches, the length L3 from the center of the wheel 16 to the discharge end 34 of the conveyor 30 is about 34 inches, the length L4 from the rear edge of the wheel 16 to the discharge end 34 of the conveyor 30 is about 24 inches, and the height H1 of the discharge end 34 above the ground 190 is about 6 feet.

In the fourth position (FIG. 13), in some embodiments, the angle A between the conveyor 30 and the ground 190 (or a plane parallel to the ground 190 and in line with the caster leveling plate) is between about 20° and about 45°. In a preferred embodiment, the angle A is about 25°. In some embodiments, the length L1 of the conveyor 30 is between about 27 feet and about 35 feet; the length L2 from the conveyor load end 36 to the center of the wheel 16 is between about 230 inches and about 270 inches; the length L3 from the center of the wheel 16 to the discharge end 34 of the conveyor 30 is between about 80 inches and about 105 inches; the length L4 from the rear edge of the wheel 16 to the discharge end 34 of the conveyor 30 is between about 70 inches and about 90 inches, and the height H1 of the discharge end 34 above the ground 190 is between about 12 feet and about 15 feet. In one preferred embodiment, the length L1 of the conveyor 30 is about 31 feet, the length L2 from the conveyor load end 36 to the center of the wheel 16 is about 247 inches, the length L3 from the center of the wheel 16 to the discharge end 34 of the conveyor 30 is about 92 inches, the length L4 from the rear edge of the wheel 16 to the discharge end 34 of the conveyor 30 is about 81 inches, and the height H1 of the discharge end 34 above the ground 190 is about 13'-8". In some embodiments, the length L1 of the conveyor 30 is between about 20 feet and about 30 feet; the length L2 from the conveyor load end 36 to the center of the wheel 16 is between about 230 inches and about 270 inches; the length L3 from the center of the wheel 16 to the discharge end 34 of the conveyor 30 is between about 25 inches and about 45 inches; the length L4 from the rear edge of the wheel 16 to the discharge end 34 of the conveyor 30 is between about 15 inches and about 35 inches, and the height H1 of the discharge end 34 above the ground 190 is between about 9 feet and about 13 feet. In one preferred embodiment, the length L1 of the conveyor 30 is about 25'-8", the length L2 from the conveyor load end 36 to the center of the wheel 16 is about 247 inches, the length L3 from the center of the wheel 16 to the discharge end 34 of the conveyor 30 is about 34 inches, the length L4 from the rear edge of the wheel 16 to the discharge end 34 of the conveyor 30 is about 23 inches, and the height H1 of the discharge end 34 above the ground 190 is about 11'-5".

In a position between FIG. 13 and FIG. 14 (as the conveyor is being raised), in some embodiments, the angle A between the conveyor 30 and the ground 190 (or a plane parallel to the ground 190 and in line with the caster leveling plate) is between about 35° and about 55°. In a preferred embodiment, the angle A is about 25°. In some embodiments, the length L1 of the conveyor 30 is between about 27 feet and about 35 feet; the length L2 from the conveyor load end 36 to the center of the wheel 16 is between about 170 inches and about 200 inches; the length L3 from the center of the wheel 16 to the discharge end 34 of the conveyor 30 is between about 80 inches and about 95 inches; the length L4 from the rear edge of the wheel 16 to the discharge end 34 of the conveyor 30 is between about 65 inches and about 85 inches, and the height H1 of the discharge end 34 above the ground 190 is between about 20 feet and about 25 feet. In one preferred embodiment, the length L1 of the conveyor 30 is about 31 feet, the length L2 from the conveyor load end 36 to the center of the wheel 16 is about 183 inches, the length L3 from the center of the wheel 16 to the discharge end 34 of the conveyor 30 is about 87 inches, the length L4 from the rear edge of the wheel 16 to the discharge end 34 of the conveyor 30 is about 76 inches, and the height H1 of the discharge end 34 above the ground 190 is about 22'-4". In some embodiments, the length L1 of the conveyor 30 is between about 20 feet and about 30 feet; the length L2 from the conveyor load end 36 to the center of the wheel 16 is between about 170 inches and about 200 inches; the length L3 from the center of the wheel 16 to the discharge end 34 of the conveyor 30 is between about 35 inches and about 50 inches; the length L4 from the rear edge of the wheel 16 to the discharge end 34 of the conveyor 30 is between about 25 inches and about 35 inches, and the height H1 of the discharge end 34 above the ground 190 is between about 16 feet and about 21 feet. In one preferred embodiment, the length L1 of the conveyor 30 is about 25'-8", the length L2 from the conveyor load end 36 to the center of the wheel 16 is about 183 inches, the length L3 from the center of the wheel 16 to the discharge end 34 of the conveyor 30 is about 42 inches, the length L4 from the rear edge of the wheel 16 to the discharge end 34 of the conveyor 30 is about 31 inches, and the height H1 of the discharge end 34 above the ground 190 is about 18'-7".

In the extended position of use (e.g., max height, FIG. 14), in some embodiments, the angle A between the conveyor 30 and the ground 190 (or a plane parallel to the ground 190 and in line with the caster leveling plate) is between about 50° and about 60°. Other desired extended positions of use can be used depending on the jobsite needs. In a preferred embodiment, the angle A is about 55°. In some embodiments, the length L1 of the conveyor 30 is between about 27 feet and about 35 feet; the length L2 from the conveyor load end 36 to the center of the wheel 16 is between about 110 inches and about 140 inches; the length L3 from the center of the wheel 16 to the discharge end 34 of the conveyor 30 is between about 85 inches and about 110 inches; the length L4 from the rear edge of the wheel 16 to the discharge end 34 of the conveyor 30 is between about 75 inches and about 100 inches, and the height H1 of the discharge end 34 above the ground 190 is between about 22 feet and about 28 feet. In one preferred embodiment, the length L1 of the conveyor 30 is about 31 feet, the length L2 from the conveyor load end 36 to the center of the wheel 16 is about 125 inches, the length L3 from the center of the wheel 16 to the discharge end 34 of the conveyor 30 is about 98 inches, the length L4 from the rear edge of the wheel 16 to the discharge end 34 of the conveyor 30 is about 87 inches, and the height H1 of the discharge end 34 above the ground 190 is about 25'-9". In some embodiments, the length L1 of the conveyor 30 is between about 20 feet and about 30 feet; the length L2 from the conveyor load end 36 to the center of the wheel 16 is between about 110 inches and about 140 inches; the length L3 from the center of the wheel 16 to the discharge end 34 of the conveyor 30 is between about 50 inches and about 70 inches; the length L4 from the rear edge of the wheel 16 to the discharge end 34 of the conveyor 30 is between about 40 inches and about 60 inches, and the height H1 of the discharge end 34 above the ground 190 is between about 19 feet and about 24 feet. In one preferred embodiment, the length L1 of the conveyor 30 is about 25'-8", the length L2 from the conveyor load end 36 to the center of the wheel 16 is about 125 inches, the length L3 from the center of the wheel 16 to the discharge end 34 of the conveyor 30 is about 61 inches, the length L4 from the rear edge of the wheel 16 to the discharge end 34 of the conveyor 30 is about 50 inches, and the height H1 of the discharge end 34 above the ground 190 is about 21'-5".

Other dimensions are possible with different length conveyors, with the conveyor positioned at different angles, and depending on the exact location where the elevating carriage is interconnected to the conveyor.

Though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

A number of variations and modifications of the invention can be used. It would be possible to provide for some features of the invention without providing others. Accordingly, features of one embodiment can be combined with features of another embodiment without the express mention of such combination here. Additionally, various features/components of one embodiment may be combined with features/components of another embodiment. For example, features/components of one figure can be combined with features/components of another figure or features/components of multiple figures. To avoid repetition, every different combination of features has not been described herein, but the different combinations are within the scope of this disclosure. Additionally, if details (including angles, dimensions, etc.) about a feature or component are described with one embodiment or one figure, then those details can apply to similar features of components in other embodiments or other figures.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A towable conveyor system comprising:
   a first towing position and a second position of use;
   a conveyor having a support frame, a plurality of support elements for conveying articles up the conveyor, an outer upper surface on which the articles are conveyed, a bottom surface opposite the outer upper surface, a drive end with a motor, and an idle end opposite the drive end;
   an elevating carriage having a first end interconnected to the support frame of the conveyor at an interconnection point, a second end opposite the first end, two or more wheels interconnected to the second end, and a support member extending upwardly from a portion of the elevating carriage between the first and second ends;
   a cable system for raising the conveyor into the second position of use and for lowering the conveyor into the first towing position;
   a first locking mechanism to releasably connect the conveyor to elevating carriage when the towable conveyor system is in the first towing position; and
   a connection mechanism positioned on the drive end or the idle end of the conveyor, the connection mechanism capable of detachably interconnecting the conveyor to a rear end of a towing vehicle.

2. The towable conveyor system of claim 1, wherein the first end of the elevating carriage is rotatable around the interconnection point.

3. The towable conveyor system of claim 1, wherein the cable system comprises a second locking mechanism to lock the towable conveyor system in the second position of use.

4. The towable conveyor system of claim 1, wherein the cable system comprises a hand winch with a brake, two cable pulleys, and a cable interconnected to the hand winch and the two cable pulleys.

5. The towable conveyor system of claim 1, wherein the support member has a first end and a second end, wherein the first end of the support member is interconnected to the elevating carriage, wherein the second end of the support member has a support cradle that engages the bottom surface of the conveyor when the towable conveyor system is in the first towing position, and wherein the first locking mechanism is interconnected to the second end of the support member.

6. The towable conveyor system of claim 5, wherein the first locking mechanism comprises a pin with a handle on a first end and a spring proximate a second end, and wherein the pin extends through an aperture in the support cradle.

7. The towable conveyor system of claim 1, wherein the first locking mechanism comprises a pin with a first end and a second end, a T-handle on the first end of the pin, a spring and a shaft collar positioned around the pin between the first and second ends of the pin, an angle iron with a substantially horizontal portion and a substantially vertical portion, and a U-shaped handle interconnected to the substantially horizontal portion of the angle iron, wherein the pin extends through an aperture in the substantially vertical portion of the angle iron and extends through the U-shaped handle.

8. The towable conveyor system of claim 1, further comprising a detachable light system interconnected to the idle end of the conveyor or the second end of the elevating carriage.

9. The towable conveyor system of claim 1, further comprising a safety chain interconnected to the bottom surface of the conveyor and the elevating carriage.

10. The towable conveyor system of claim 1, wherein the conveyor is positioned at an angle between about 20 degrees and about 65 degrees relative to the ground when the towable conveyor system is in the second position of use, and wherein the conveyor is positioned at an angle between about 5 degrees and about 20 degrees relative to the ground when the towable conveyor system is in the first towing position.

11. A towable conveyor system comprising:
    a first towing position and a second position of use;
    a conveyor having a support frame, a plurality of support elements for conveying articles up the conveyor, an outer upper surface on which the articles are conveyed, a bottom surface opposite the outer upper surface, a drive end with a motor, and an idle end opposite the drive end;
    an elevating carriage having a first end interconnected to the support frame of the conveyor at an interconnection point, a second end opposite the first end, two or more wheels interconnected to the second end, a center portion between the first and second ends, a first locking mechanism to releasably connect the conveyor to the elevating carriage, and two support members, wherein each support member has a first end interconnected to the center portion of the elevating carriage and a second end opposite the first end, wherein the first locking mechanism is interconnected to the second end of one of the support members;
    a cable system for raising the conveyor into the second position of use and for lowering the conveyor into the first towing position, wherein the cable system comprises a hand winch interconnected to the conveyor, two cable pulleys interconnected to the elevating carriage, and a cable interconnected to the hand winch and the two cable pulleys;
a hitch positioned on the drive end of the conveyor, the hitch capable of detachably interconnecting the conveyor to a rear end of a towing vehicle; and
a detachable light system interconnected to the idle end of the conveyor or the second end of the elevating carriage.

12. The towable conveyor system of claim 11, wherein the first end of the elevating carriage is rotatable around the interconnection point.

13. The towable conveyor system of claim 11, wherein the cable system comprises a second locking mechanism to lock the towable conveyor system in the second position of use.

14. The towable conveyor system of claim 11, wherein the first locking mechanism comprises a pin with a first end and a second end, a T-handle on the first end of the pin, a spring and a shaft collar positioned around the pin between the first and second ends of the pin, an angle iron with a substantially horizontal portion and a substantially vertical portion, and a U-shaped handle interconnected to the substantially horizontal portion of the angle iron, wherein the pin extends through an aperture in the substantially vertical portion of the angle iron and extends through the U-shaped handle.

15. The towable conveyor system of claim 11, further comprising a safety chain interconnected to the bottom surface of the conveyor and the elevating carriage.

16. The towable conveyor system of claim 11, wherein the conveyor is positioned at an angle between about 20 degrees and about 65 degrees relative to the ground when the towable conveyor system is in the second position of use, and wherein the conveyor is positioned at an angle between about 5 degrees and about 20 degrees relative to the elevating carriage when the towable conveyor system is in the first towing position.

17. A method of conveying articles comprising:
providing a towable conveyor system for conveying articles, the towable conveyor system comprising:
a conveyor having a support frame, a plurality of support elements for conveying articles up the conveyor, an outer upper surface on which the articles are conveyed, a bottom surface opposite the outer upper surface, a drive end with a motor, and an idle end opposite the drive end;
an elevating carriage having a first end interconnected to the support frame of the conveyor at an interconnection point, a second end opposite the first end, two or more wheels interconnected to the second end, and a support member extending upwardly from a portion of the elevating carriage between the first and second ends;
a cable system comprising a hand winch interconnected to the conveyor, two cable pulleys interconnected to the elevating carriage, and a cable interconnected to the hand winch and the two cable pulleys;
a first locking mechanism to releasably connect the conveyor to elevating carriage; and
a connection mechanism positioned on the drive end or the idle end of the conveyor;
interconnecting the connection mechanism to a rear end of a towing vehicle such that the connection mechanism is in a first towing position and the towable conveyor system is in a towing position;
towing the towable conveyor system;
disconnecting the connection mechanism from the rear end of the towing vehicle;
moving the connection mechanism into a second position;
cranking the hand winch to winch the cable;
moving the conveyor and/or the elevating carriage toward each other until the conveyor is in a desired position of use; and
conveying the articles on the outer upper surface of the conveyor.

18. The method of claim 17, further comprising pulling a handle of the first locking mechanism and releasing the conveyor from the elevating carriage before cranking the hand winch.

19. The method of claim 17, further comprising chocking the two or more wheels.

20. The method of claim 17, wherein the towable conveyor system further comprises a safety chain, and wherein the method further comprises securing the safety chain to the bottom surface of the conveyor at a desired safety chain length.

* * * * *

UNITED STATES PATENT AND TRADEMARK OFFICE
CERTIFICATE OF CORRECTION

PATENT NO. : 10,988,322 B2
APPLICATION NO. : 16/793974
DATED : April 27, 2021
INVENTOR(S) : Job Bacon-Maldonado, III et al.

It is certified that error appears in the above-identified patent and that said Letters Patent is hereby corrected as shown below:

On the Title Page

In item [57], at Line 10 under ABSTRACT, the text "a second with two or more wheels" should read --a second end with two or more wheels--.

In the Claims

Claim 1, Column 17, Lines 58-59, the text "connect the conveyor to elevating carriage" should read --connect the conveyor to the elevating carriage--.

Signed and Sealed this
Fourteenth Day of June, 2022

Katherine Kelly Vidal
*Director of the United States Patent and Trademark Office*